US007251782B1

(12) United States Patent
Albers et al.

(10) Patent No.: US 7,251,782 B1
(45) Date of Patent: Jul. 31, 2007

(54) METHOD AND APPARATUS FOR VALIDATING USER INPUT FIELDS IN A GRAPHICAL DISPLAY

(75) Inventors: Michael C. Albers, San Francisco, CA (US); Anne M. Fowler, Los Gatos, CA (US); Suzanna L. Smith, San Francisco, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 581 days.

(21) Appl. No.: 10/873,757

(22) Filed: Jun. 22, 2004

(51) Int. Cl.
  *G06F 3/01* (2006.01)
(52) U.S. Cl. .................. 715/711; 715/710; 715/715; 715/772; 715/708
(58) Field of Classification Search .............. 715/705, 715/706, 708, 710, 711, 780
  See application file for complete search history.

(56) References Cited

U.S. PATENT DOCUMENTS

| 5,774,887 | A | * | 6/1998 | Wolff et al. ............... 707/1 |
| 2003/0212740 | A1 | * | 11/2003 | Berrigan et al. ............ 709/203 |
| 2004/0181749 | A1 | * | 9/2004 | Chellapilla et al. ......... 715/505 |
| 2004/0189708 | A1 | * | 9/2004 | Larcheveque et al. ...... 345/780 |
| 2004/0226002 | A1 | * | 11/2004 | Larcheveque et al. ...... 717/126 |
| 2005/0198563 | A1 | * | 9/2005 | Kristjansson ............... 715/507 |

* cited by examiner

*Primary Examiner*—Weilun Lo
*Assistant Examiner*—Kim-Lynn Dam
(74) *Attorney, Agent, or Firm*—Chapin IP Law, LLC; Barry W. Chapin, Esq.

(57) ABSTRACT

For validating user input fields in a graphical user interface, a data entry field includes a graphical validation indicator. In response to user activation of the validation indicator, such as by hovering with an on-screen pointer, a message is displayed in visual association with the data entry field. The message describes one or more expected characteristics of the data to be entered, for example that the data is numerical. As the user enters data consistent with the expected characteristics, the validation indicator is displayed with a neutral appearance, indicating that no errors have been detected. If incorrect data is detected, the validation indicator takes on an emphasized appearance, such as a higher intensity and/or an error-indicating color such as red, providing an immediate error indication to the user. An error message may also be displayed in visual association with the data entry field. The error message is preferably displayed with an emphasized appearance, and may specifically identify the error in the entered data.

42 Claims, 7 Drawing Sheets

FIG. 4

- Last Name: 36 38
- First Name:
- Street Address #1:
- Street Address #2:
- City:
- State:
- Zip Code:

Reset  Submit

FIG. 5

40  36  38
- Last Name:
- First Name:
- Street Address #1:
- Street Address #2:
- City:
- State: 42  44
- Zip Code:

Reset  Submit

FIG. 6

- Last Name: Doe
- First Name: Jonathan
- Street Address #1: 1307 Howard Street
- Street Address #2:
- City:
- State:
- Zip Code:

Please provide a U.S. zip code (numbers only)

48  52  50  54

Reset  Submit

FIG. 7

- Last Name: Doe
- First Name: Jonathan
- Street Address #1: 1307 Howard Street
- Street Address #2:
- City:
- State:
- Zip Code: 94107

54

48

Reset  Submit

Last Name: Doe
First Name: Jonathan
Street Address #1: 1307 Howard Street
Street Address #2:
City:
State:
Zip Code: 94 1o7 — 48
A U.S. zip code can only contain numbers ('o' is not valid) — 64

Reset   Submit

METHOD AND APPARATUS FOR VALIDATING USER INPUT FIELDS IN A GRAPHICAL DISPLAY

BACKGROUND OF THE INVENTION

The present invention is related to the field of validating user input in a graphical user interface of a computerized system.

A common function of a graphical user interface is to provide a mechanism for a user of a computerized system, such as personal computer or workstation, to enter data that is to be provided to an application program. The application program may be executing on the computerized system itself, or it may be executing on another computer that is communicatively coupled to the computerized system. This latter configuration is common, for example, in distributed "client-server" applications of the type commonly deployed in the Internet-based World Wide Web. In Web applications, the user interface is in the form of a Web page that is displayed on a user's personal computer by a browser application. The Web page contains various fields for data entry along with user-activatable objects such as buttons and scroll bars, for example.

Many applications, including Web-based client server applications, provide some degree of checking or validation of user-entered data. Such validation might take the form, for example, of determining whether entered data is of the correct type or amount. In current systems, it is common for validation to be performed only after all the data for a particular page has been entered and the user has activated a "complete" or "submit" button. The page is transferred from the client to the server, where the application program performs the validation of the input data on the page. If one or more errors are found, the page is re-posted on the user's display with an error message. The error message commonly appears near the top of the re-posted page so as to be readily noticed by the user.

SUMMARY OF THE INVENTION

In the existing form-based techniques for validating user input, there is generally no visual connection between a displayed error message and the field(s) in which the error(s) have been detected. Upon receiving the re-posted form with the error message, the user is forced to go back through the form to find the field(s) of interest, modify the entered data, and then re-submit the form. The process may have to be repeated if a mistake is repeated or a new mistake is made during the process of correcting an initial mistake. This process of error detection and correction is slow and cumbersome.

In accordance with the present invention, a method and apparatus for validating user input fields in a graphical display of a computerized system is disclosed. A data entry field displayed on the graphical display includes a graphical validation indicator indicating that data entered in the data entry field is subject to validation. In one embodiment, the validation indicator is an encircled script letter "i" on a contrasting background, and it is located at the far right of the data entry field. In response to user activation of the validation indicator, such as by hovering with an on-screen pointer, a message is displayed in visual association with the data entry field. The message describes one or more expected characteristics of data to be received by the computerized system via the data entry field. For example, the message might indicate that a number rather than non-numerical text is expected. The message can be displayed, for example, in a semi-transparent manner immediately adjacent to the data entry field.

As the user enters data into the data entry field, it is determined dynamically whether the entered data is consistent with the expected characteristics. If so, the validation indicator is displayed with a neutral appearance, indicating to the user that there are no errors and that the user should continue entering data. However, if data is entered that is inconsistent with the expected characteristics, the validation indicator changes to have an emphasized appearance, for example by displaying it with higher intensity and/or in an error-indicating color, such as red. This indicates to the user that there is an error in the data being entered, and thus provides the user with an immediate opportunity to correct the error before proceeding to other data entry fields. The user is not required to submit the entire form before being notified of the error, nor to search for a field of interest after being presented with an error message that is visually dissociated from the field.

In conjunction with displaying the validation indicator with the emphasized appearance, a second message may also be dynamically displayed in visual association with the data entry field. The second message describes one or more of the expected characteristics that the user-entered data is inconsistent with, and may specifically identify the error that the user has made. For example, if a number is expected and the user enters a letter, the second message might inform the user that the entered letter is not a number. In one embodiment, the second message is displayed when the user activates the validation indicator, such as by hovering. The second message is preferably displayed with an emphasized appearance. In one embodiment, the second message is displayed in a message box whose border is of the same error-indicating color as the validation indicator. The validation indicator can also be moved from the data entry field to the message box, to help the user understand the purpose of the message.

Other features and advantages of the present invention are described in the Detailed Description below.

BRIEF DESCRIPTION OF THE SEVERAL VIEWS OF THE DRAWING

FIGS. 4–10 are diagrams of screens displayed in the client computerized system during execution of the process of FIG. 3.

DETAILED DESCRIPTION

Figure 1:
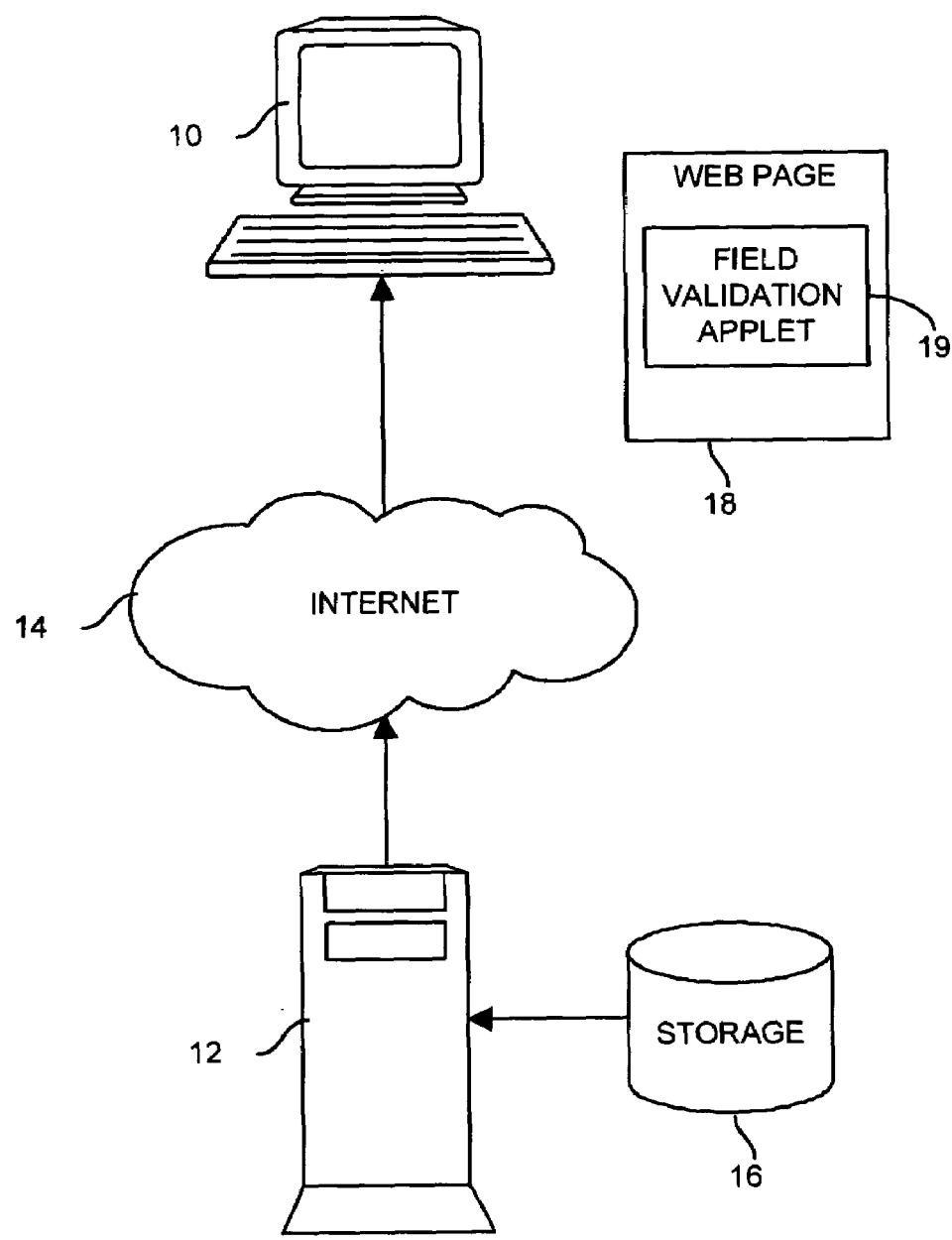
FIG. 1 is a block diagram of a distributed computer system including a client computerized system in accordance with the present invention.

FIG. 1 shows a distributed, client-server environment typical of the World Wide Web, for example. Client and server computer systems 10 and 12 respectively are connected to a network such as the Internet 14. The client 10 is a computerized system such as a personal computer or workstation capable of running a Web browser or similar graphical user interface and a field validation application of the type described herein. The server 12 has access to storage device(s) 16 which store Web pages for serving to clients such as the client 10. Shown in FIG. 1 is a Web page 18 which is associated with a field validation "applet" or application program 19 that is downloaded and executed by the client 10 in conjunction with the displaying of the Web page 18 at the client 10. As is commonly known in the art, the Web page 18 is a software object written in a markup language such as Hyptertext Markup Language (HTML) or Extensible Markup Language (XML), and the field validation applet 19 may be written in a programming language such as the Java® programming language developed by Sun Microsystems, Inc. On the request of the browser at the client 10, the server 12 retrieves the Web page 18 from storage 16 and transmits it to the client 10 via the Internet 14. Upon receiving the Web page 18, the client 10 renders the graphical content on a local graphical display device. The client 10 also obtains and executes the field validation applet 19, which interacts with a user via the displayed graphical content in a manner set forth in detail below.

Figure 2:
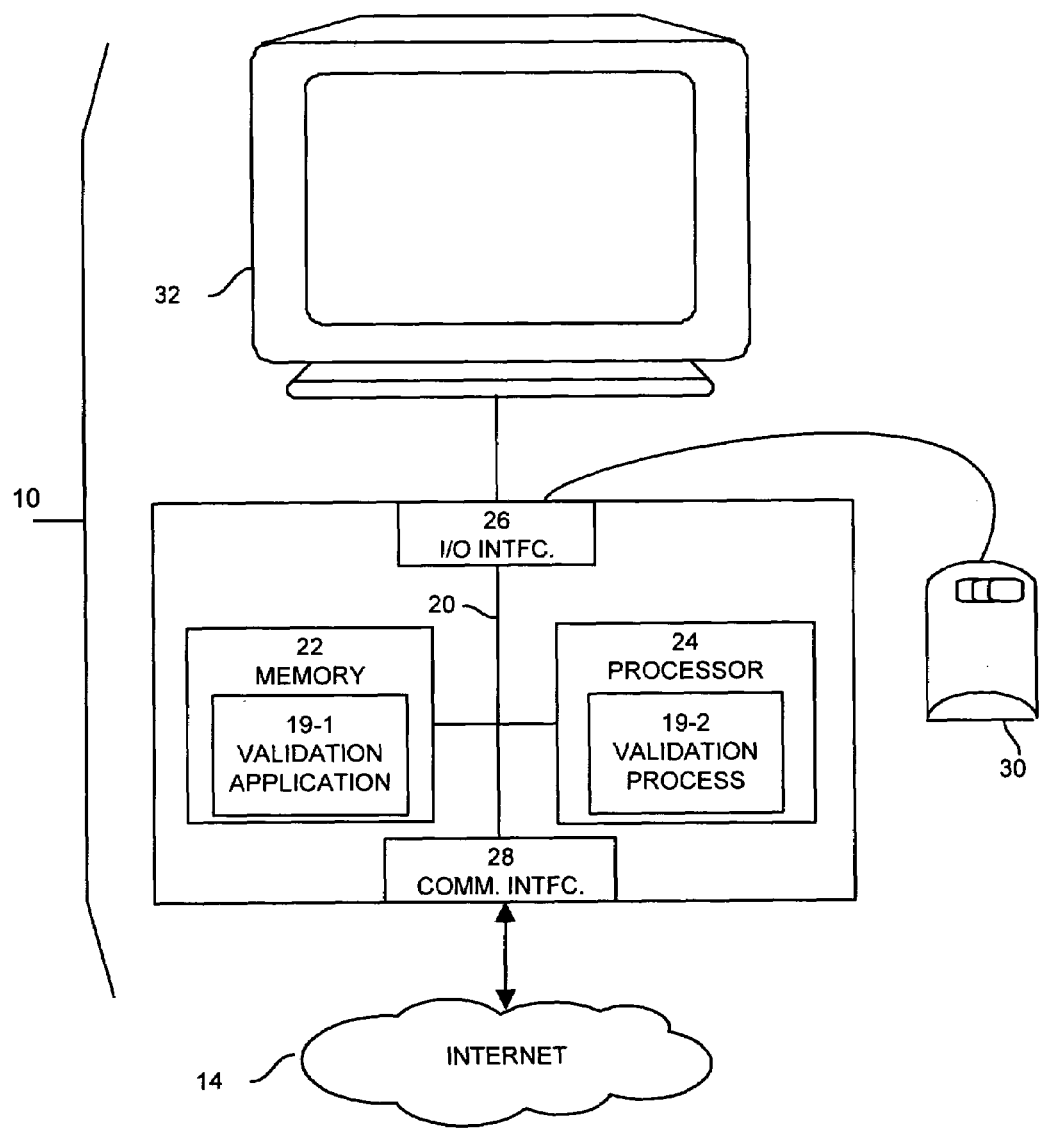
FIG. 2 is a block diagram of the client computerized system of FIG. 1.

FIG. 2 illustrates an example arrangement of the client 10 configured according to embodiments of the invention. The client 10 includes an interconnection mechanism 20 that couples a memory system 22, a processor 24, an input/output interface 26 and a communications interface 28. The input/output interface 26 allows peripheral devices to be connected to the client 10. In this example, coupled to the input/output interface 26 and operating as part of the client 10, are a peripheral input device 30 such as a mouse and/or a keyboard and a peripheral output device such as a computer display 32 upon which the client 10 can render or otherwise display visual images such as a graphical user interface as described herein. The communications interface 28 allows the client 10 to communicate with devices (i.e., resources) that operate within the Internet 14.

The memory system 22 is encoded with a field validation application 19-1. The field validation application 19-1 represents software code such as data and/or logic instructions (e.g., stored in the memory 22 or on another computer readable medium such as a disk) that embody the processing functionality of embodiments of the invention. The processor 24 can access the memory system 22 via the interconnection mechanism 20 in order to launch, run, execute, interpret or otherwise perform the logic instructions of the field validation application 19-1 in order to produce a field validation process 19-2. In other words, the field validation process 19-2 represents one or more portions of the field validation application 19-1 (or the entire application 19-1) executing within or upon the processor 24 in the client 10. It is to be understood that the field validation applet 19 embedded in the Web page 18 of FIG. 1 is represented in FIG. 2 by either one or both of the field validation application 19-1 and/or the field validation process 19-2. For purposes of the discussion of the operation of embodiments of the invention, general reference will be made to the field validation applet 19 as performing the various steps and operations to carry out the features of embodiments of the invention.

Is to be understood that embodiments of the invention include the field validation application 19-1 (i.e., the unexecuted or non-performing logic instructions and/or data) encoded within a computer readable medium such as a floppy disk, hard disk or in an optical medium, or in a memory type system such as in firmware, read only memory (ROM), or, as in this example, as executable code within a memory system such as memory system 22 (e.g., within random access memory or RAM). It is also to be understood that other embodiments of the invention can provide the field validation application 19-1 operating within the processor 24 as the field validation process 19-2. While not shown in this example, those skilled in the art will understand that the client 10 may include other processes and/or software and hardware components, such as an operating system, which have been left out of this illustration for ease of description of the invention. In addition, the display 32 need not be coupled directly to the computerized device. In such cases, the field validation applet 19 can execute on one computerized device and can be remotely accessed, for example, over a network in which case the graphical user interface is displayed locally to the user, while the field validation process 19-2 is executed remotely.

Directing attention now to the graphical user interface, when the field validation process 19-2 operates within the client 10, a user can use the input device 30 to control an input selector such as a mouse pointer to perform to direct "focus" to specified displayed graphical elements, such as data entry fields and icons, according to the embodiments of the invention. The processor 24 performs the field validation process 19-2 to carry out this processing as explained herein. Specific operations of embodiments of the invention are discussed next with reference to a flow chart of processing steps in FIG. 3 and exemplary graphical displays in the remaining Figures.

Figure 3:
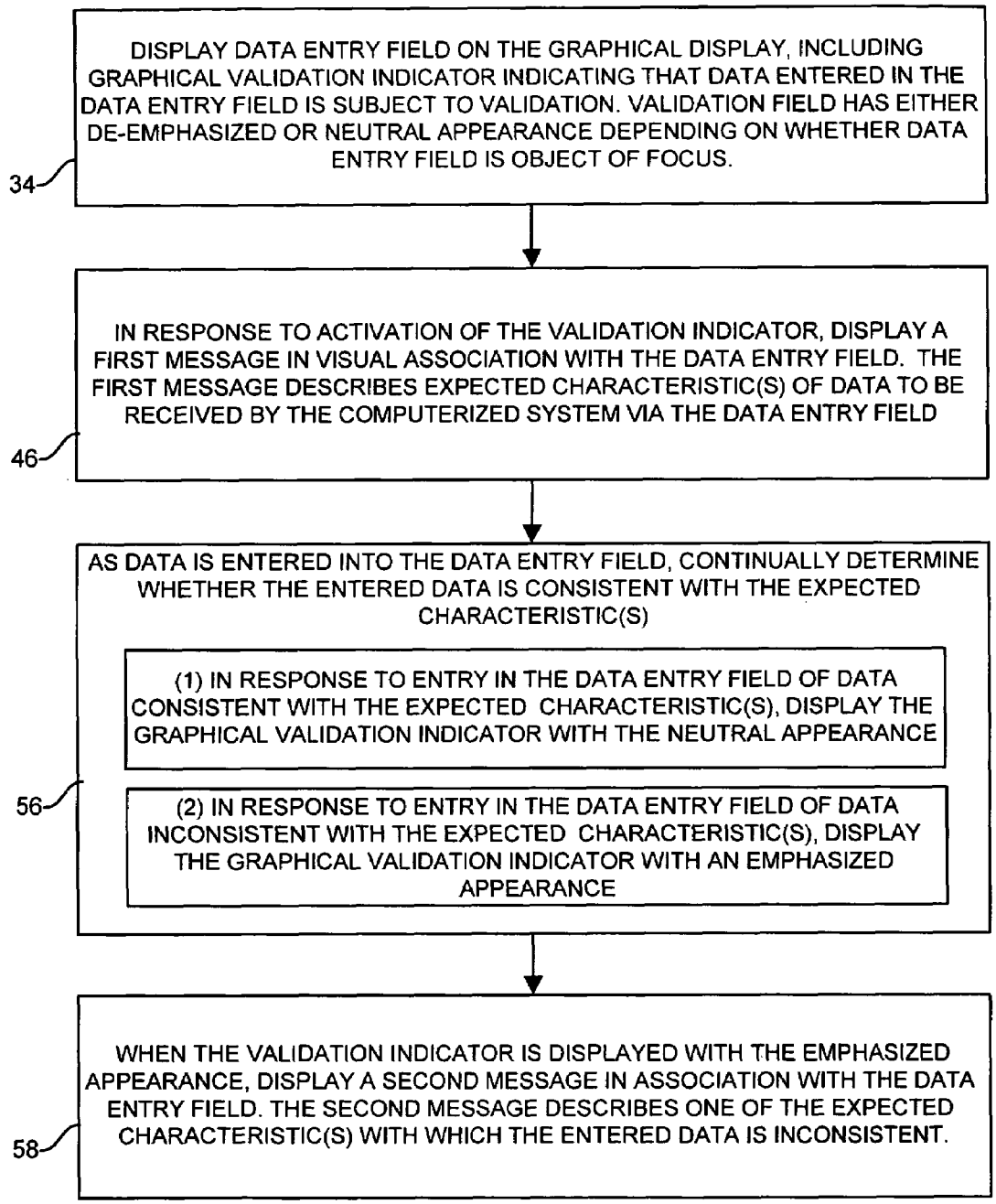
FIG. 3 is a flow diagram of a process of validating user input in the client computerized system of FIG. 2.

Turning now to FIG. 3, at step 34 the field validation applet 19 displays one or more data entry fields on the display 32, for example as part of displaying the Web page 18. The result is shown in FIG. 4, in which the data entry field of interest is the Last Name field 36. The field 36 contains a graphical validation indicator 38, which in the illustrated embodiment takes the form of a circular icon including the script letter "i". It is assumed that the field 36 is not initially the object of user "focus", i.e., the user has not placed a cursor in the field 36 or otherwise selected the field 36. In this case, the validation indicator 38 has a de-emphasized or faded appearance.

FIG. 5 shows the result when a user subsequently directs focus to the Last Name field 36, such as by placing a cursor 40 therein. In this case, the validation indicator 38 takes on a non-faded or neutral appearance, providing a visual indication to the user that the field 36 is the object of focus. It will be observed that in other fields such as the City field 42 that is not the object of focus, the validation indicator 44 retains the de-emphasized appearance.

Referring again to FIG. 3, in step 46 the field validation applet 19 responds to user activation of a validation indicator by displaying a first message that describes one or more expected characteristics of the data to be entered into a data entry field. An example of the result is shown in FIG. 6, in which the field of interest is the ZIP code field 48 and the message is displayed in a message box 50. User activation is accomplished for example by the user "mousing over" or "hovering" on the location of the validation indicator with a pointer 52 (see FIG. 6). In the illustrated example, the message describes a characteristic of a valid U.S. ZIP code, namely that it uses only numbers. The message box 50 is a pop-up message box that is placed immediately adjacent to ZIP code field 48. Although immediate adjacency is not required, it is preferable that the message be displayed in a manner that visually associates it with the data entry field to which it pertains.

In the illustrated example, the message box 50 is filled in a semi-transparent manner, which can be especially useful if it is displayed on top of navigable features of the graphical user interface. The message box 50 may alternatively employ an opaque background. The validation indicator 54 is moved from the data entry field 48 into the message box 50, providing visual information to the user regarding the function of the message and its association with the data entry field 48. The outline of the message box 50 is visually neutral, and the validation indicator 54 has the same neutral appearance as the validation indicator 38 of FIG. 5. Although not specifically shown in the Figures, the activation of the validation indicator 54 and the displaying of the message box 50 can also occur when the data entry field 48 is not the object of user focus. In that case, the validation indicator 54 appearing in the message box 50 has the same de-emphasized appearance as the validation indicator 38 of FIG. 4.

In the illustrated embodiment, the validation indicator 54 appears at the far right of the message box 50. It will be appreciated that in alternative embodiments the location of the validation indicator 54 may be elsewhere within the message box 50, and that the location may be determined either statically or dynamically. Also, the moving of the validation indicator 54 into the message box 50 is itself optional—it may be desirable in alternative embodiments to leave the validation indicator 54 in the data entry field 48.

Referring again to FIG. 3, in step 56 the field validation applet 19 monitors the entering of data into the data entry field 48, such as typically accomplished by a user via a conventional keyboard device (not shown in the Figures). The entered data is continually compared with information within the field validation applet 19 describing the expected characteristics of the data, such as the requirement for only numbers in a value entered in the ZIP code field 48. This comparison can take the form, for example, of determining whether the ASCII code for an entered character falls between the respective ASCII codes for the digits "0" and "9". If the entered data is consistent with the expected characteristics of the data (e.g., the ASCII code falls between the codes for "0" and "9"), then the data entry field 48 and the validation indicator 54 continue to be displayed with a neutral appearance, indicating to the user that the data entry process is proceeding normally.

If during the data entry process the entered data is found to be inconsistent with the expected characteristics of the data (e.g., an ASCII code is not between the codes for "0" and "9"), then the data entry field 48 and validation indicator 54 are given a more visually emphasized appearance to visually indicate to the user that erroneous input data has been detected. An example is given in FIG. 7, in which the lowercase letter "o" has been entered as part of the ZIP code. The border of the data entry field 48 is changed to an error-indicating color, such as red, that stands out from the color of the field 48 itself. Also, the color of the validation indicator 54 is changed to the error-indicating color. These changes in the display alert the user to the presence of an error in the field 48.

Figures 8, 9:
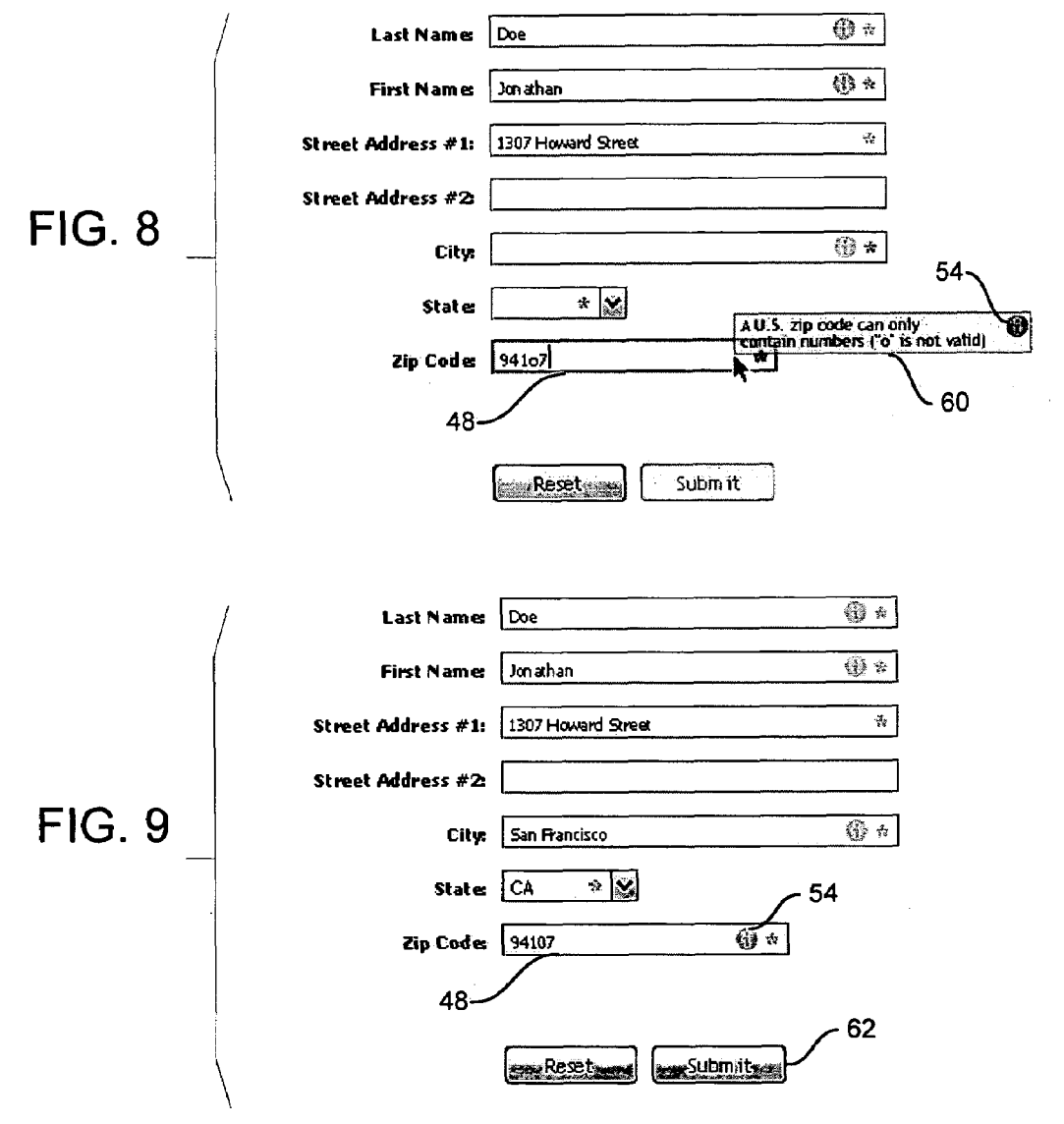

Referring again to FIG. 3, in step 58 the field validation applet 19 responds to user activation of the visually emphasized validation indicator 54, such as by mousing over the validation indicator 54 as described above, by displaying a second message that describes how the entered data is inconsistent with the expected characteristics of the data expected in the data entry field 48. An exemplary result is shown in FIG. 8. In the illustrated example, this message again describes the requirement for only numbers in a valid ZIP code, and points out that "o" is not a number. Because the second message is displayed after a specific error has been made, the second message can be more specifically tailored to provide the user with information about how to correct the specific error. It will be appreciated that such a tailored message is necessarily generated dynamically. For example, there may be multiple types of second messages pertaining to different expected characteristics of data to be entered, such as whether it is numerical, whether it is text-only, etc. Then, depending on the type of error made by the user, a given message can be selected from among the multiple types of second messages. It may be desirable in alternative embodiments (e.g., for simplicity) to utilize statically generated second messages.

As shown in FIG. 8, the second message is displayed in a pop-up message box 60. With respect to the positioning and background color of the message box 60, considerations apply that are similar to those discussed above in connection with message box 50. The validation indicator 54 is moved into the message box 60 and is displayed with the error-indicating color. The border of the message box 60 also has the error-indicating color.

FIG. 9 illustrates a condition in which correct data (such as the value 94107) has been entered in the ZIP code field 48. It will be noted that the appearance of the validation indicator 54 has reverted to the faded or non-emphasized appearance. In FIG. 9, the various fields in the user interface screen have all been filled in, and therefore a Submit button 62 is made available to enable the user to submit the form. When the user does so, the data from the various fields is provided to the application program that is executing on the server 12 (FIG. 1). Because the client 10 itself has validated the entered data, there is no possibility of any subsequent re-posting of the Web page 18 due to the presence of invalid data.

FIG. 10 illustrates an alternative presentation of the messages associated with the field validation process. The messages are displayed in a message box 64 that is more visually integrated with the field 48. In particular, the top of the message box 64 is co-incident with, and thus visually connected to, the bottom border of the data entry field 48. The message box 64 thus appears as an extension of the data entry field 48. The illustrated arrangement can be used for both the non-error condition and the error condition, which is the specific condition shown in FIG. 10.

The manner in which the message boxes 50, 60 and 64 appear on the display can be animated in different ways. One basic approach is to display the message box abruptly or instantaneously, i.e., to immediately transition from having no message box on the display to having the message box with full intensity. As an alternative, the message box can be "faded in" or brought to full intensity gradually. For the more integrated message box 64 of FIG. 10, it may be desirable that the message box 64 be displayed as gradually sliding downward from the data entry field 48.

What is claimed is:

1. A computer-implemented method of validating input data in a graphical user interface displayed on a graphical display of a computerized system, comprising:

displaying a data entry field on the graphical display, the data entry field including a graphical validation indicator indicating that data entered in the data entry field is subject to validation;

in response to user activation of the validation indicator, displaying a message in visual association with the data entry field, the message describing one or more expected characteristics of data to be received by the computerized system via the data entry field;

upon data being entered into the data entry field, determining whether the entered data is consistent with the expected characteristics;

in response to the entry of data consistent with the expected characteristics, displaying the validation indicator with a neutral appearance; and in response to the entry of data inconsistent with the expected characteristics, displaying the validation indicator with an emphasized appearance.

2. A method according to claim 1, wherein the message is a first message, and further comprising:
when the validation indicator is displayed with the emphasized appearance, displaying a second message in visual association with the data entry field, the second message being displayed in a message box with an emphasized appearance and containing the validation indicator, the second message describing one of the expected characteristics with which the user-entered data is inconsistent.

3. A method according to claim 2, wherein the second message appears only upon user activation of the validation indicator.

4. A method according to claim 2, wherein the second message is a statically defined message.

5. A method according to claim 2, wherein the second message is dynamically generated in response to the data entry and describes a specific aspect of the entered data that is inconsistent with the expected characteristics.

6. A method according to claim 2, wherein the second message is one of multiple types of second messages, each type of second message pertaining to a different one of the expected characteristics, and further comprising selecting the second message from among the multiple types of second messages based on which of the expected characteristics the entered data is inconsistent with.

7. A method according to claim 1, wherein the validation indicator has a neutral appearance when the data entry field is the subject of user focus, and the validation indicator has a de-emphasized appearance when the data entry field is not the subject of user focus.

8. A method according to claim 7, wherein the de-emphasized appearance of the validation indictor is a faded appearance with respect to the neutral appearance.

9. A method according to claim 1, wherein the validation indicator has a first color when displayed with a neutral appearance, and has a second color different from the first color when displayed with the emphasized appearance.

10. A method according to claim 1, wherein the data entry field has a border, the border having a first color when the validation indicator is displayed with the neutral appearance, the border having a second color different from the first color when the validation indicator is displayed with the emphasized appearance.

11. A method according to claim 1, wherein the message is displayed in a message box, and further comprising moving the validation indicator from the data entry field into the message box.

12. A method according to claim 11, wherein the validation indicator is displayed in a dynamically determined location in the message box.

13. A method according to claim 1, wherein the message is displayed in a message box having a transparent background such that other graphical objects displayed at the same location on the display are visible.

14. A method according to claim 13, wherein the message box is a pop-up box having one corner at the location of the validation indicator in the data entry field.

15. A method according to claim 13, wherein the message box is a drop-down box having an upper border substantially co-linear with a lower border of the data entry field.

16. A method according to claim 15, wherein the message box is displayed in a scrolling manner so as to appear to be sliding downward out of the data entry field.

17. A method according to claim 1, wherein user activation of the validation indicator comprises pointing at the validation indicator with a pointer on the display.

18. A method according to claim 1, wherein the computerized system is a client system in a client-server environment, and the entered data upon being validated is provided to an application program executing on a server system in the client-server environment.

19. A method according to claim 18, carried out by execution of a data validation application program delivered to the client in conjunction with hypertext data representing a user interface screen of which the data entry field is a component.

20. A computer-implemented method of validating input data in a client-server computer system, the method being carried out by execution of a data validation application program at the client computer, the data validation program being delivered to the client computer in conjunction with hypertext data representing a user interface screen, the user interface screen having a data entry field for which entered data is to be validated, comprising:
displaying the user interface screen including the data entry field on a graphical display of the client computer;
displaying a graphical validation indicator in the data entry field, the validation indicator indicating that data entered in the data entry field is subject to validation, the validation indicator having a de-emphasized appearance when the data entry field is not the subject of user focus;
in response to user activation of the validation indicator by pointing to the validation indicator with a pointer on the graphical display, displaying a first message in visual association with the data entry field, the first message being displayed in a first message box with a neutral appearance and containing the validation indicator, the first message describing one or more expected characteristics of data to be received by the client-server computer system via the data entry field;
in response to user de-activation of the validation indicator by pointing at an object other than the validation indicator with the pointer on the graphical display, removing the first message box from the display;
as data is entered into the data entry field, determining whether the entered data is consistent with the expected characteristics;
in response to the entry of data consistent with the expected characteristics, displaying the validation indicator with a neutral appearance;
in response to the entry of data inconsistent with the expected characteristics, displaying the validation indicator with an emphasized appearance; and
upon user activation of the validation indicator when data inconsistent with the expected characteristics has been entered in the data entry field, displaying a second message in visual association with the data entry field, the second message being displayed in a message box with an emphasized appearance and containing the validation indicator, the second message describing one of the expected characteristics with which the user-entered data is inconsistent.

21. A computerized system, comprising:
a graphical display operative to display a graphical user interface; and a processor coupled to the graphical display, the processor being operative to execute a method of validating input data in the graphical user interface, the method comprising:

displaying a data entry field as part of the graphical user interface on the graphical display, the data entry field including a graphical validation indicator indicating that data entered in the data entry field is subject to validation;

in response to user activation of the validation indicator, displaying a message in visual association with the data entry field, the message describing one or more expected characteristics of data to be received by the computerized system via the data entry field;

upon data being entered into the data entry field, determining whether the entered data is consistent with the expected characteristics;

in response to the entry of data consistent with the expected characteristics, displaying the validation indicator with a neutral appearance; and in response to the entry of data inconsistent with the expected characteristics, displaying the validation indicator with an emphasized appearance.

22. A computerized system according to claim 21, wherein the message is a first message, and wherein the processor is further operative:

when the validation indicator is displayed with the emphasized appearance, to display a second message in visual association with the data entry field, the second message being displayed in a message box with an emphasized appearance and containing the validation indicator, the second message describing one of the expected characteristics with which the user-entered data is inconsistent.

23. A computerized system according to claim 22, wherein the second message appears only upon user activation of the validation indicator.

24. A computerized system according to claim 22, wherein the second message is a statically defined message.

25. A computerized system according to claim 22, wherein the second message is dynamically generated in response to the data entry and describes a specific aspect of the entered data that is inconsistent with the expected characteristics.

26. A computerized system according to claim 22, wherein the second message is one of multiple types of second messages, each type of second message pertaining to a different one of the expected characteristics, and wherein the processor is further operative to select the second message from among the multiple types of second messages based on which of the expected characteristics the entered data is inconsistent with.

27. A computerized system according to claim 21, wherein the validation indicator has a neutral appearance when the data entry field is the subject of user focus, and the validation indicator has a de-emphasized appearance when the data entry field is not the subject of user focus.

28. A computerized system according to claim 27, wherein the de-emphasized appearance of the validation indictor is a faded appearance with respect to the neutral appearance.

29. A computerized system according to claim 21, wherein the validation indicator has a first color when displayed with a neutral appearance, and has a second color different from the first color when displayed with the emphasized appearance.

30. A computerized system according to claim 21, wherein the data entry field has a border, the border having a first color when the validation indicator is displayed with the neutral appearance, the border having a second color different from the first color when the validation indicator is displayed with the emphasized appearance.

31. A computerized system according to claim 21, wherein the message is displayed in a message box, and wherein the processor is further operative to move the validation indicator from the data entry field into the message box.

32. A computerized system according to claim 31, wherein the validation indicator is displayed in a dynamically determined location in the message box.

33. A computerized system according to claim 21, wherein the message is displayed in a message box having a transparent background such that other graphical objects displayed at the same location on the display are visible.

34. A computerized system according to claim 33, wherein the message box is a pop-up box having one corner at the location of the validation indicator in the data entry field.

35. A computerized system according to claim 33, wherein the message box is a drop-down box having an upper border substantially co-linear with a lower border of the data entry field.

36. A computerized system according to claim 35, wherein the message box is displayed in a scrolling manner so as to appear to be sliding downward out of the data entry field.

37. A computerized system according to claim 21, wherein user activation of the validation indicator comprises pointing at the validation indicator with a pointer on the display.

38. A computerized system according to claim 21, wherein the computerized system is a client system in a client-server environment, and wherein the processor is further operative upon validating the entered data to provide the entered date to an application program executing on a server system in the client-server environment.

39. A computerized system according to claim 38, wherein the data validating method is carried out by execution of a data validation application program delivered to the client in conjunction with hypertext data representing a user interface screen of which the data entry field is a component.

40. A computerized client computer in a client-server computer system, comprising:

a graphical display operative to display a graphical user interface; and a processor coupled to the graphical display, the processor being operative to execute a method of validating input data in the graphical user interface, the method being carried out by execution of a data validation application program at the client computer, the data validation program being delivered to the client computer in conjunction with hypertext data representing a user interface screen, the user interface screen having a data entry field for which entered data is to be validated, the method comprising:

displaying the user interface screen including the data entry field on a graphical display of the client computer displaying a graphical validation indicator in the data entry field, the validation indicator indicating that data entered in the data entry field is subject to validation, the validation indicator having a de-emphasized appearance when the data entry field is not the subject of user focus;

in response to user activation of the validation indicator by pointing to the validation indicator with a pointer on the graphical display, displaying a first message in visual association with the data entry field, the first message being displayed in a first message box with a neutral appearance and containing the validation indicator, the first message describing one or more expected characteristics of data to be received by the client-server computer system via the data entry field;

in response to user de-activation of the validation indicator by pointing at an object other than the validation indicator with the pointer on the graphical display, removing the first message box from the display;

as data is entered into the data entry field, determining whether the entered data is consistent with the expected characteristics;

in response to the entry of data consistent with the expected characteristics, displaying the validation indicator with a neutral appearance;

in response to the entry of data inconsistent with the expected characteristics, displaying the validation indicator with an emphasized appearance; and upon user activation of the validation indicator when data inconsistent with the expected characteristics has been entered in the data entry field, displaying a second message in visual association with the data entry field, the second message being displayed in a message box with an emphasized appearance and containing the validation indicator, the second message describing one of the expected characteristics with which the user-entered data is inconsistent.

41. A computer program product that includes a computer readable medium having instructions stored thereon for validating input data in a graphical user interface displayed on a graphical display of a computerized system, such that the instructions, when carried out by the computerized system, cause the computerized system to:

display a data entry field on the graphical display, the data entry field including a graphical validation indicator indicating that data entered in the data entry field is subject to validation;

in response to user activation of the validation indicator, display a message in visual association with the data entry field, the message describing one or more expected characteristics of data to be received by the computerized system via the data entry field;

upon data being entered into the data entry field, determine whether the entered data is consistent with the expected characteristics;

in response to the entry of data consistent with the expected characteristics, display the validation indicator with a neutral appearance; and in response to the entry of data inconsistent with the expected characteristics, display the validation indicator with an emphasized appearance.

42. A computerized system, comprising:

means for displaying a graphical user interface;

means for displaying a data entry field as part of the graphical user interface on the graphical display, the data entry field including a graphical validation indicator indicating that data entered in the data entry field is subject to validation;

means responsive to user activation of the validation indicator for displaying a message in visual association with the data entry field, the message describing one or more expected characteristics of data to be received by the computerized system via the data entry field;

means for determining, upon data being entered into the data entry field, whether the entered data is consistent with the expected characteristics;

means responsive to the entry of data consistent with the expected characteristics for displaying the validation indicator with a neutral appearance; and means responsive to the entry of data inconsistent with the expected characteristics for displaying the validation indicator with an emphasized appearance.

* * * * *